United States Patent [19]

Vierkötter

[11] Patent Number: 4,582,230

[45] Date of Patent: Apr. 15, 1986

[54] METERING DEVICE

[75] Inventor: Peter Vierkötter, Leverkusen, Fed. Rep. of Germany

[73] Assignee: Henkel Kommanditgesellschaft auf Aktien, Duesseldorf, Fed. Rep. of Germany

[21] Appl. No.: 540,447

[22] Filed: Oct. 11, 1983

[30] Foreign Application Priority Data

Mar. 7, 1983 [DE] Fed. Rep. of Germany ....... 3308013

[51] Int. Cl.⁴ .............................................. G01F 11/26
[52] U.S. Cl. ..................................... 222/442; 222/453; 222/500
[58] Field of Search .................... 222/365, 424.5, 425, 222/442, 450, 451, 453–457, 476, 500

[56] References Cited

U.S. PATENT DOCUMENTS

| | | | |
|---|---|---|---|
| 645,706 | 3/1900 | Grant | 222/453 |
| 1,038,465 | 9/1912 | Warner et al. | 222/453 X |
| 1,138,419 | 5/1915 | Schultz | 222/476 |
| 1,279,014 | 9/1918 | Schimel | 222/451 X |
| 2,017,839 | 10/1935 | Berendt | 222/500 X |
| 2,133,679 | 10/1938 | Woeltjen | 222/442 |
| 2,408,463 | 10/1946 | Wright | 222/500 |
| 4,063,666 | 12/1977 | Downing et al. | 222/455 |
| 4,438,869 | 3/1984 | Vierkötter et al. | 222/500 X |

FOREIGN PATENT DOCUMENTS

| | | |
|---|---|---|
| 71180 | 9/1915 | Austria . |
| 3026067 | 2/1982 | Fed. Rep. of Germany . |
| 331534 | 11/1935 | Italy ................................... 222/500 |
| 340386 | 5/1936 | Italy ................................... 222/453 |
| 630578 | 6/1982 | Switzerland . |
| 14045 | of 1909 | United Kingdom . |
| 393223 | 6/1933 | United Kingdom ............... 222/365 |

OTHER PUBLICATIONS

European Search Report.

*Primary Examiner*—Joseph J. Rolla
*Assistant Examiner*—Kevin P. Shaver
*Attorney, Agent, or Firm*—Ernest G. Szoke; Nelson Littell, Jr.; Henry E. Millson, Jr.

[57] ABSTRACT

The invention relates to a metering device for insertion into the mouth of a liquid container comprising an elongated cylinder having a cylindrical outlet opening extending beyond the mouth of said liquid container and one or more openings at the other end communicating with the interior of said liquid container, a metering chamber in said elongated cylinder, toward said outlet opening, a ball valve chamber in said elongated cylinder and a ball valve between the interior of the container and the metering chamber. The ball valve consisting of a valve ball and its seat is situated at the inlet opening of the metering chamber on the container side. In order always to obtain the same metered quantity irrespective of the tilting speed and the hydrostatic pressure which is determined by the filling level of the container, the valve ball is connected by a piston rod to a piston mounted for displacement in the cylindrical outlet opening of the metering chamber.

1 Claim, 3 Drawing Figures

METERING DEVICE

BACKGROUND OF THE INVENTION

This invention relates to a metering device for insertion into the mouth of a liquid container, more particularly a bottle, comprising an elongated cylinder having a cylindrical outlet opening extending beyond the mouth of said liquid container and one or more openings at the other end communicating with the interior of said liquid container, a metering chamber in said elongated cylinder, toward said outlet opening, a ball valve chamber in said elongated cylinder and a ball valve between the interior of the container and a metering chamber consisting of a valve ball resting in a cage in the upright position of the container and of a valve ball guide tube for guiding the valve ball into its sealing position when the container is tilted, the cage and/or the guide tube comprising at least one opening to the interior of the container. The invention also relates to a method of operating the metering device.

Metering devices which release a certain quantity of liquid whenever the container is tilted are known, for example, from German Pat. No. 1,202,672. Metering devices of this type are so-called antechamber dispensers of which the volume must comprise at least twice the quantity to be metered. Although another known metering device (see German Utility Model No. 78 10 073) is less voluminous, the metered quantity decreases steadily as the contents of the container diminish.

In addition, published German application DE-OS No. 30 26 067 and U.S. patent application Ser. No. 348,065, filed Feb. 8, 1982 now U.S. Pat. No. 4,438,869, describe a metering device in which metering can take place under pressure or by the application of pressure to the container so that a "squirt" corresponding to a certain quantity of product is dispensed. This device comprises a valve ball guide tube with at least one lateral opening leading to the interior of the container. At its longitudinal end facing the pour-out opening and the valve ball in its sealing position, the valve ball guide tube is adjoined, starting from the tube wall, by a bottom part of a ball cage which widens like a funnel to a length substantially corresponding to half the ball diameter. When this metering device is tilted into an inclined position, liquid issues from the container.

OBJECTS OF THE INVENTION

An object of the present invention is to provide a metering device which always dispenses the same quantity irrespective of the tilting speed and the hydrostatic pressure difference which is determined by the container filling level.

Another object of the present invention is the development of a metering device dispensing the same quantity of liquid for sealing insertion into the mouth of a liquid container comprising an elongated substantially cylindrical liquid-impervious device having a cylindrical outlet opening extending beyond the mouth of said liquid container and at least one opening at the other end communicating with the interior of the liquid container, a metering chamber in said elongated device toward said outlet opening, a ball valve chamber in said elongated device toward said at least one opening at the other end, having a valve ball resting in said ball valve chamber in the upright position of the container and a valve ball guide tube terminating in a sealing seat for guiding the valve ball into its sealing position when the container is tilted, said valve ball guide tube being in liquid communication with said metering chamber through said sealing seat, an outlet opening of said metering chamber opposite said valve ball guide tube sealing seat in the form of a cylinder adapted for piston closure, a piston having a fixed coupling with said ball valve by means of a piston rod having a length greater than the distance between the valve ball in its seating position and the output side of said outlet opening, whereby when the container is inverted, the ball valve seats and the piston is pushed beyond the said outlet opening allowing discharge of said metering chamber.

These and other objects of the invention will become more apparent as the description hereof proceeds.

DESCRIPTION OF THE INVENTION

According to the invention, the above objects are achieved in a metering device of the type mentioned in the background of the invention by virtue of the fact that the outlet opening of the metering chamber facing the valve ball in its sealing position is in the form of a cylinder with a piston closure, by virtue of the fact that the piston closure consists of a piston displaceable relative to the outlet opening and of a piston rod which establishes a fixed coupling between the piston and the valve ball and by virtue of the fact that the length of the piston rod is greater than the distance between the valve ball in its sealing position and the output side of the cylindrical outlet opening.

More particularly, the present invention relates to a metering device dispensing the same quantity of liquid for sealing insertion into the mouth of a liquid container comprising an elongated substantially cylindrical liquid-impervious device having a cylindrical outlet opening extending beyond the mouth of said liquid container and at least one opening at the other end communicating with the interior of the liquid container, a metering chamber in said elongated device toward said outlet opening, a ball valve chamber in said elongated device toward said at least one opening at the other end, having a valve ball resting in said ball valve chamber in the upright position of the container and a valve ball guide tube terminating in a sealing seat for guiding the valve ball into the sealing position when the container is tilted, said valve ball guide tube being in liquid communication with said metering chamber though said sealing seat, an outlet opening of said metering chamber opposite said valve ball guide tube sealing seat in the form of a cylinder adapted for piston closure, a piston having a fixed coupling with said ball valve by means of a piston rod having a length greater than the distance between the valve ball in its sealing position and the output side of said outlet opening, whereby when the container is inverted, the ball valve seats and the piston is pushed beyond the said outlet opening allowing discharge of said metering chamber.

The length of the piston rod and/or the length of the cylindrical outlet opening and/or of the piston are preferably selected in such a way that the outlet opening of the metering chamber is open when the valve ball is in its sealing position and closed in any other position of the valve ball. According to the invention, therefore, the metering chamber is filled, with the outlet opening closed by the piston, by tilting the container into an inclined position, and when the container is turned into the fully inverted position, the metering chamber is opened on the outlet side by automatic displacement of the piston and the valve ball connected to the piston through the piston rod. At the same time or as a result, the metering chamber is closed at the inlet opening on the container side. When the piston releases the outlet opening, therefore, the flow of product from the interior of the container into the metering chamber is closed by the valve ball which is then in its sealing position. The hydrostatic pressure which changes as the container 4 is emptied has no effect on the metered quantity.

For operating and handling the metering device, it is of advantage for the valve ball, in an inclined position of the container mouth or of the metering device, to be firmly held on a retaining edge or on a ledge between the ball cage and the valve ball guide tube while, at the same time, the piston closes the outlet end of the metering chamber. To this end, the piston rod may have to be inclined to a certain extent relative to the longitudinal axis of the metering device. Accordingly, it is favorable for the piston and/or the piston rod to have a certain flexibility to allow inclination without jamming. In this connection, the function of the metering device may also be supported by making the metering device as a whole and particularly its cylindrical outlet opening of a flexible plastic material.

Further details of the invention will become apparent from the following diagrammatic illustration of one example of embodiment. In the accompanying drawings.

Figure 1:
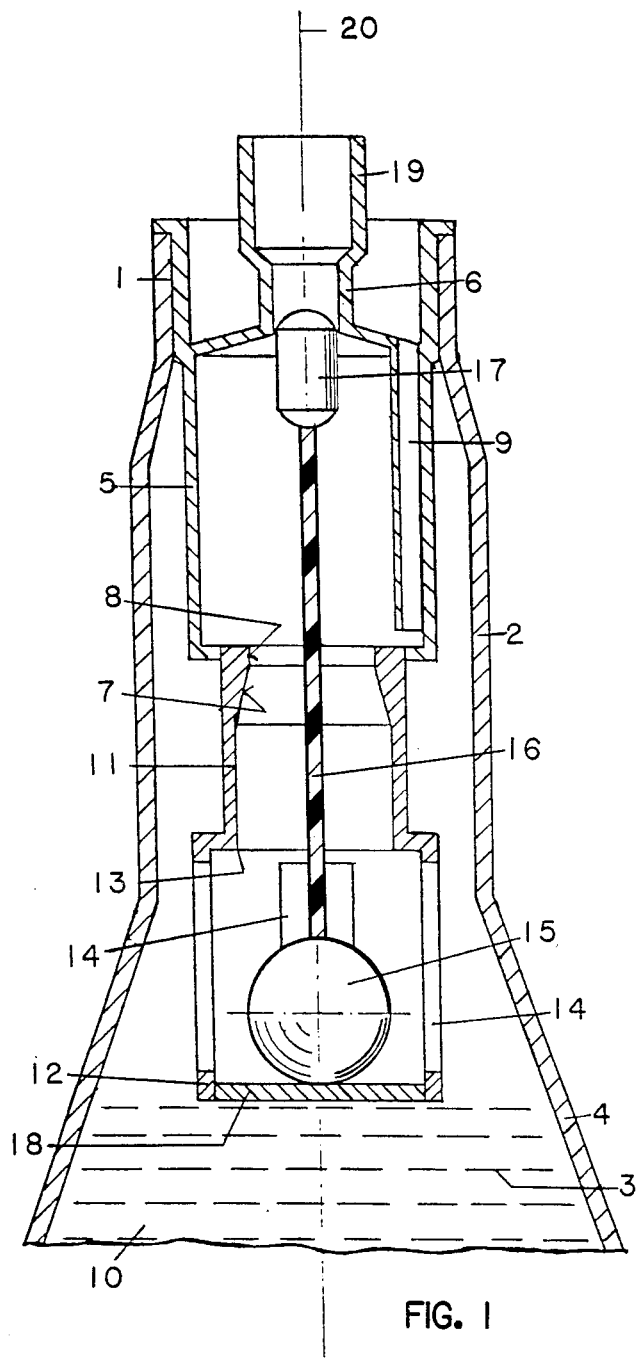
FIG. 1 shows a metering device in the upright position.
Figure 2:
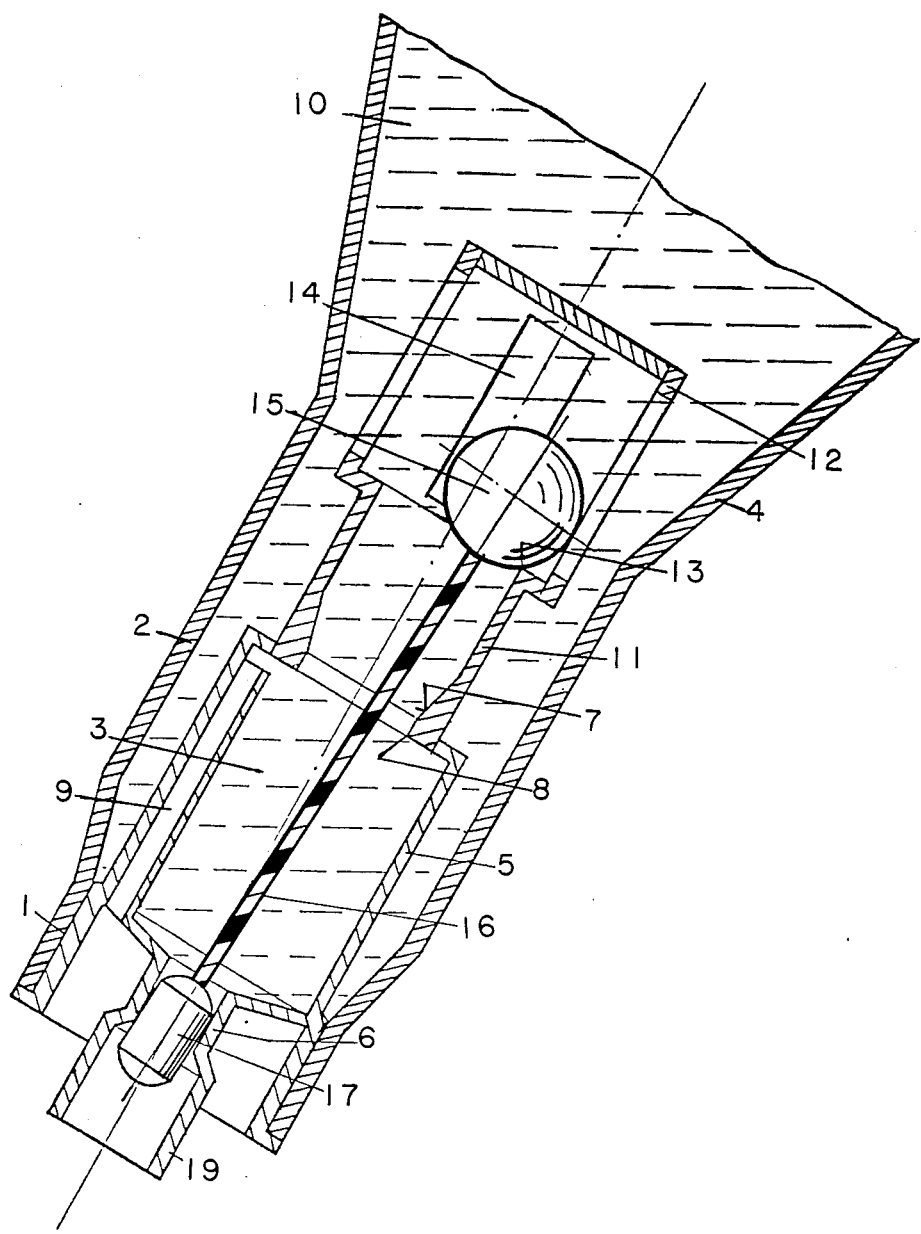
FIG. 2 shows the metering device illustrated in FIG. 1 tilted obliquely downwards.
Figure 3:
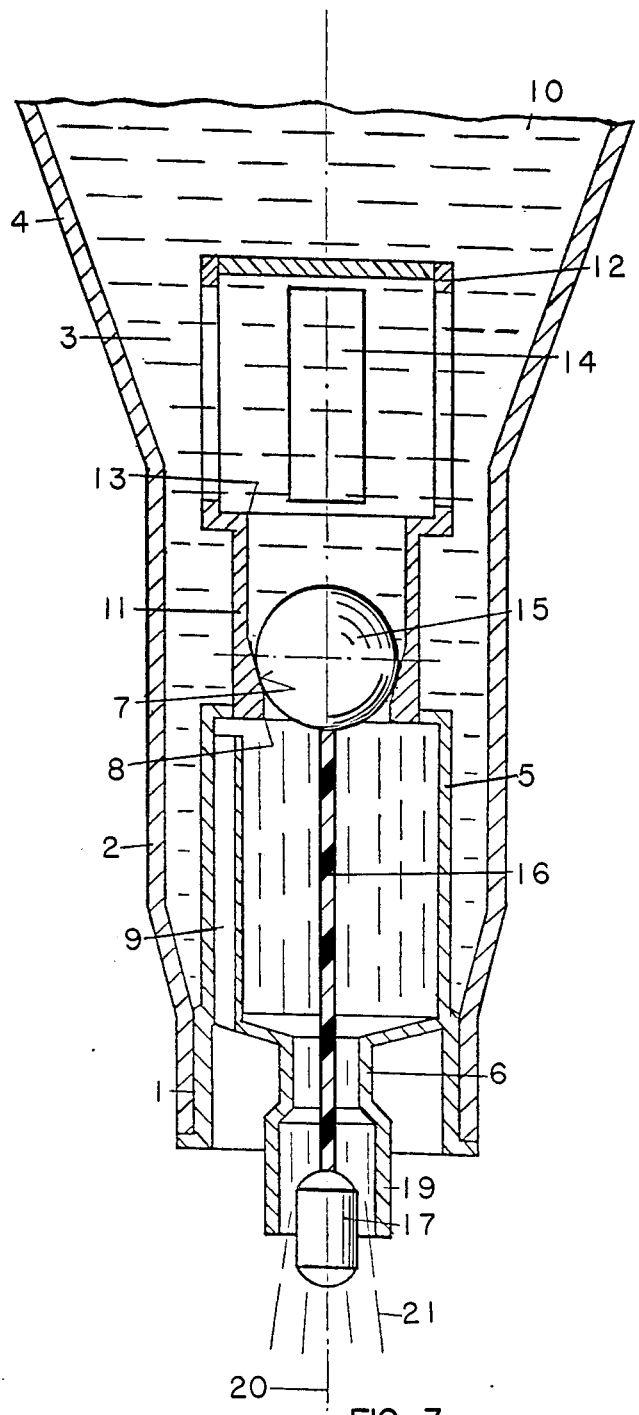
FIG. 3 shows the metering device illustrated in FIG. 2 in its inverted position.

The metering device shown in FIGS. 1 to 3 is held in the mouth 2 of a container accommodating a liquid product 3 by means of a plug-type or screw-type joint 1. This metering device consists essentially of a metering chamber 5 with a cylindrical outlet opening 6 and an inlet opening 8 on the container side in the form of a valve ball seat 7. In addition, the metering chamber 5 comprises a vent 9 which is separated from the outlet opening and which opens in the interior of the chamber adjoining the inlet opening 8. The valve ball seat 7 is adjointed towards the interior 10 of the container by a valve ball guide tube 11 which opens into a valve ball cage 12. A ledge or a retaining edge 13 is preferably provided at the boundary between the guide tube 11 and the ball cage 12. At least one slot 14 is provided in the region of the ball cage 12 and/or the guide tube 11, being intended to represent a connecting opening of relatively large area between the interior of the metering device and the interior 10 of the container.

In addition to the fixed parts, the metering device comprises a moving part which is made up of a valve ball 15, a piston rod 16 and a piston 17. The length of the piston rod 16 is gauged in such a way that, when the valve ball 15 bears against the base 18 of the ball cage 12 on the container side in the upright position shown in FIG. 1, the cylindrical outlet opening 6 is closed by the piston 17. In the inclined position shown in FIG. 2 with the valve ball 15 resting on the retaining edge 13, the cylindrical outlet opening 6 is also closed by the piston 17. However, in the fully inverted position shown in FIG. 3, with the valve ball 15 in its sealing position 7, the outlet opening 6 of the metering chamber 5 is open because, in this position, the piston 17 has been completely pushed through the outlet opening 6, optionally into an outlet funnel 19. The open and closed positions at the outlet opening 6 may of course also be influenced by varying the length of the piston 17 and/or of the outlet opening 6 in the axial longitudinal direction 20 of the device.

In operation, the metering device is tilted out of the upright position shown in FIG. 1 into the position shown in FIG. 2 in which it is directed obliquely downwards so that the ball 15 is still held on the retaining edge 13. In this tilted position, product 3 flows through the slot 14 into the metering device, filling the metering chamber 5. After the metering chamber 5 has been filled, the metering device is turned into the inverted position shown in FIG. 3. In this position, the ball 15 drops into its sealing position 7 so that the connection between the metering chamber 5 and the interior 10 of the container is closed. On account of the fixed coupling between the valve ball 15 and the piston 17 via the piston rod 16, the piston 17 is displaced from the cylindrical outlet opening 6—on entry of the ball 15 into its sealing position 7—so far outwards into the region of the funnel 19 that product 21 is able to issue from the metering chamber 5. Emptying of the metering chamber 5 is made much easier by incorporation of the vent 9. The vent 9 is intended to end immediately adjacent the inlet end 8 of the metering chamber 5 to prevent product from issuing through the vent pipe 9.

The preceding specific embodiment is illustrative of the practice of the invention. It is to be understood however, that other expedients known to those skilled in the art or disclosed herein may be practiced without departing from the spirit of the invention or the scope of the appended claims.

I claim:

1. A combination of a metering device with a suitable liquid container having a neck portion, the metering device measuring the quantity of liquid poured from said liquid container, said metering device sealingly inserted in the mouth of said neck portion and comprising an elongated substantially cylindrical device having a cylindrical outlet of a flexible plastic material extending beyond the mouth of said neck portion and at least one opening at the other end communicating with the interior of the liquid container, a metering chamber in said elongated device towards said outlet having a vent therein, a ball valve chamber in said elongated device toward said at least one opening at the other end having a valve ball resting in said ball valve chamber in the upright position of the container, said ball valve chamber having a valve ball retaining shoulder adjacent said at least one opening at the other end, and a valve ball guide tube terminating in a sealing seat for guiding the valve ball into a sealing position with said seat when the container is upside down, said valve ball guide tube being in liquid communication with said metering chamber through said sealing seat, an outlet opening of said metering chamber opposite said valve ball guide tube sealing seat in the form of a cylinder adapted for piston closure, a piston of flexible material having a fixed length coupling with said ball valve by means of a flexible piston rod having a length sufficient that said piston closes said cylindrical outlet of said metering chamber in the upright position of the container and with the valve ball resting in said valve ball chamber opposite the valve ball in its sealing position and wherein said piston is situated at a distance from and in front of said cylindrical outlet in the upside down position of the container with said valve ball lowered into its sealing position whereby when the container is tilted, said valve ball is retained on said valve ball retaining shoulder, said piston is pushed into and seals said cylindrical outlet and said metering chamber is in liquid communication with the interior of the liquid container and whereby when the container is upside down, the ball valve seats and simultaneously the piston is pushed beyond the said outlet opening allowing discharge of liquid from said metering chamber.

* * * * *